United States Patent
Manouvrier et al.

(10) Patent No.: US 9,411,176 B2
(45) Date of Patent: Aug. 9, 2016

(54) OXIDE CAPACITOR ELECTRO-OPTICAL PHASE SHIFTER

(71) Applicants: STMICROELECTRONICS (CROLLES 2) SAS, Crolles (FR); STMICROELECTRONICS SA, Montrouge (FR)

(72) Inventors: Jean-Robert Manouvrier, Echirolles (FR); Frédéric Boeuf, Le Versoud (FR)

(73) Assignees: STMICROELECTRONICS (CROLLES 2) SAS, Crolles (FR); STMICROELECTRONICS SA, Montrouge (FR)

( * ) Notice: Subject to any disclaimer, the term of this patent is extended or adjusted under 35 U.S.C. 154(b) by 0 days.

(21) Appl. No.: 14/492,435

(22) Filed: Sep. 22, 2014

(65) Prior Publication Data
US 2015/0093067 A1    Apr. 2, 2015

(30) Foreign Application Priority Data
Oct. 2, 2013   (FR) ...................................... 13 59558

(51) Int. Cl.
*G02F 1/025* (2006.01)
*G02F 1/225* (2006.01)
*G02F 1/21* (2006.01)

(52) U.S. Cl.
CPC ................ *G02F 1/025* (2013.01); *G02F 1/225* (2013.01); *G02F 2001/212* (2013.01)

(58) Field of Classification Search
CPC .... G02F 1/225; G02F 1/025; G02F 2001/212
See application file for complete search history.

(56) References Cited

U.S. PATENT DOCUMENTS

| 5,381,365 A * | 1/1995 | Ajika | H01L 27/10817 257/296 |
| 8,554,022 B1 * | 10/2013 | Hochberg | H01L 29/66977 257/21 |
| 8,958,678 B2 * | 2/2015 | Thomson | G02F 1/025 385/132 |
| 2004/0208454 A1 * | 10/2004 | Montgomery | G02F 1/2257 385/50 |
| 2004/0213307 A1 * | 10/2004 | Lieber | B82Y 10/00 372/39 |

(Continued)

FOREIGN PATENT DOCUMENTS

WO    2011089386    7/2011
WO    WO 2011089386 A1 *    7/2011    .............. G02F 1/025

OTHER PUBLICATIONS

Liu et al., A graphene-based broadband optical modulator, Letter-Research, Nature vol. 474, pp. 64-67, Jun. 2, 2011.*

(Continued)

*Primary Examiner* — Peter Radkowski
(74) *Attorney, Agent, or Firm* — Allen, Dyer, Doppelt, Milbrath & Gilchrist, P.A.

(57) ABSTRACT

An electro-optical phase shifter to be located in an optical waveguide may include a rib of a semiconductor material extending along a length of the optical waveguide and a control structure configured to modify a concentration of carriers in the rib according to a control voltage present between first and second control terminals of the phase shifter. The control structure may include a conductive layer covering a portion of the rib and electrically connected to a first of the control terminals. An insulating layer may be configured to electrically isolate the conductive layer from the rib.

10 Claims, 4 Drawing Sheets

(56) References Cited

U.S. PATENT DOCUMENTS

| | | | |
|---|---|---|---|
| 2005/0207691 A1* | 9/2005 | Keyser | G02B 6/131 385/1 |
| 2009/0235721 A1* | 9/2009 | Robinson | B82Y 20/00 73/31.05 |
| 2010/0215309 A1 | 8/2010 | Shubin et al. | |
| 2010/0291828 A1* | 11/2010 | Reches | A61L 27/56 442/340 |
| 2011/0102068 A1* | 5/2011 | Bouchiat | G01N 27/4146 327/527 |
| 2011/0104442 A1* | 5/2011 | Yoon | B82Y 30/00 428/152 |
| 2011/0116168 A1* | 5/2011 | Nikoobakht | B82Y 20/00 359/585 |
| 2011/0180795 A1 | 7/2011 | Lo et al. | |
| 2012/0257850 A1 | 10/2012 | Fujikata et al. | |
| 2013/0058606 A1* | 3/2013 | Thomson | G02F 1/025 385/14 |
| 2013/0101247 A1* | 4/2013 | Cho | G02F 1/025 385/1 |
| 2014/0056551 A1* | 2/2014 | Liu | G02F 1/025 385/2 |

OTHER PUBLICATIONS

Liu et al., Double-Layer Graphene Optical Modulator, Nano Lett., 2012, 12 (3), pp. 1482-1485.*

D. J. Thomson, F. Y. Gardes, J. Fedeli, S. Zlatanovic, Y. Hu, B. P. P. Kuo, E. Myslivets, N. Alic, S. Radic, G. Z. Mashanovich, and G. T. Reed, "High data rate silicon optical modulator with self-aligned fabrication process," in Optical Fiber Communication Conference, OSA Technical Digest (Optical Society of America, 2012), paper OM2E.3.*

Thomson et al., "High data rate silicon optical modulator with self-aligned fabrication process", OFC/NFOEC Technical Digest, 2012, pp. 1-3.

* cited by examiner

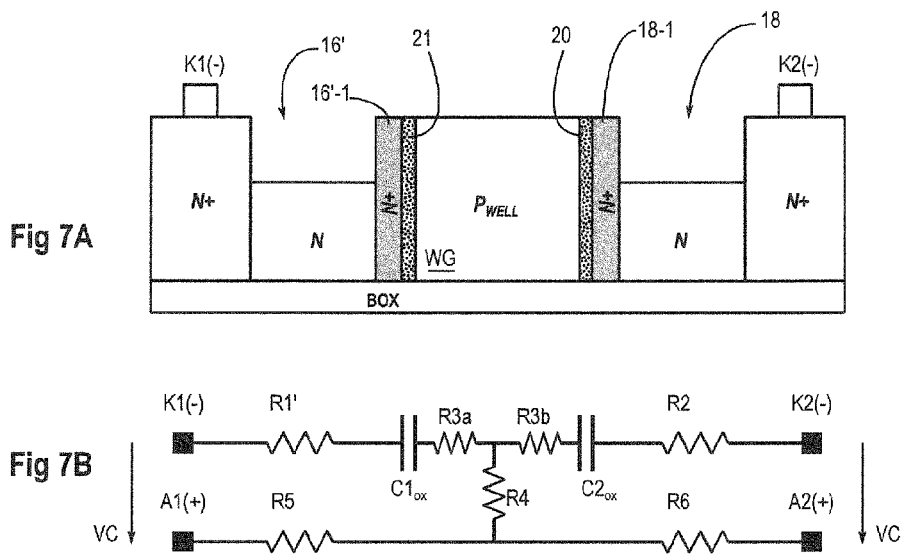
Fig 7A
Fig 7B
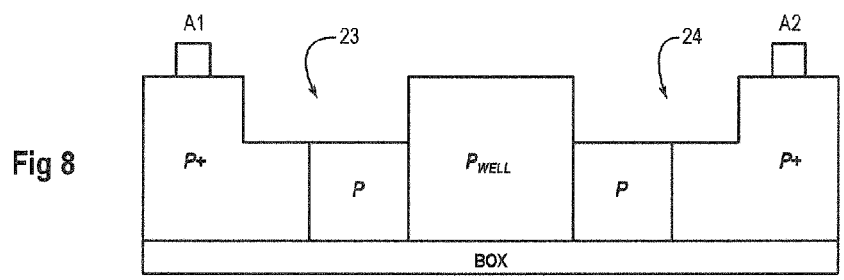
Fig 8
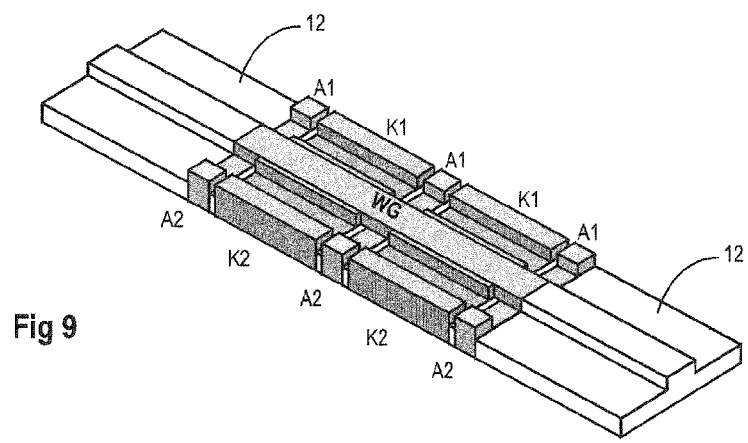
Fig 9

OXIDE CAPACITOR ELECTRO-OPTICAL PHASE SHIFTER

FIELD OF THE INVENTION

The invention relates to optical modulators, in particular to electro-optical phase shifters for use in such modulators.

BACKGROUND OF THE INVENTION

FIG. 1 schematically shows an optical modulator according to the principle of the Mach-Zehnder interferometer, commonly called MZI modulator. The modulator includes an optical waveguide receiving a power P, which is divided into two branches at a point S. The two branches join again at a point J, one directly and the other via an electro-optical phase shifter 10. Each branch carries half of the original optical power.

The carriers arriving via the two branches are summed at point J of the modulator, one carrier having been shifted by $\phi$ by the phase shifter 10. The resulting carrier has a power P·cos $2(\phi/2)$, neglecting the optical losses.

FIG. 2 shows a perspective view of a branch of the waveguide 12 incorporating a phase shifter 10, shown in gray. The waveguide is formed in a transparent island, of intrinsic semiconductor material, having an inverted "T" cross-section, whose central rib WG carries the optical beam. The phase shifter is configured to replace a segment of the waveguide and has the same inverted "T" cross-section. The edges of the phase shifter bear electrical contacts serving to control the phase shifter—they usually extend above the plane of the waveguide, as shown, to reach the metal levels.

FIG. 3 schematically shows a sectional view of a so-called high-speed phase modulator (HSPM) phase shifter 10. The cross-section plane is perpendicular to the axis of the optical waveguide. A dashed circle, at the center of rib WG represents the area of concentration of the optical beam.

The phase shifter includes a semiconductor structure of same nature as that of the waveguide, generally silicon, forming a PN junction 14 in a plane parallel to the axis of the waveguide and offset with respect to the axis. The junction 14 has been shown, as an example, at the right sidewall of the rib WG, but its position may vary, according to the application, between the sidewall and the center of the rib.

A P-doped region extends to the left of the junction 14, conforming to the section of the waveguide, i.e. including an elevated portion at the level of the rib WG, and a lower side wing 16 towards the left edge. Zone P ends to the left by a P+ doped raised area bearing an anode contact A. An N– doped wing 18 extends to the right of the junction 14, conforming to the section of the waveguide. The wing 18 ends to the right by an N+ doped raised area bearing a cathode contact C. The structure of the phase shifter may be formed on an insulating substrate, for example a buried oxide layer BOX.

To control the phase shifter of FIG. 3, a voltage is applied between the anode and cathode contacts A, C, which reverse-biases the junction 14 (the "plus" on the cathode and the "minus" on the anode). This configuration causes a displacement of electrons e from the N region to the cathode and of holes h from the P region to the anode, and the creation of a depletion region D in the vicinity of the junction 14. The carrier concentration is thus modified in accordance with the magnitude of the bias voltage in the area crossed by the optical beam, which results in a corresponding modification of the refractive index of this area.

The sensitivity of the electro-optical phase shifter depends on the capacitance $C_J$ of the junction 14, which represents the carrier concentration that is obtainable in the central area WG as a function of the control voltage. The sensitivity increases with the doping level of the area WG, but increasing the doping level also increases the optical losses. The P doping level in this area is often higher than the doping level of the original substrate to reach a satisfactory sensitivity.

SUMMARY OF THE INVENTION

An electro-optical phase shifter offering an advantageous compromise between a high sensitivity and low optical losses is desirable. This desire is addressed by an electro-optical phase shifter configured to be located in an optical waveguide, that includes a rib of a semiconductor material, extending the waveguide, and a control structure configured to modify the concentration of carriers in the rib according to a control voltage present between first and second control terminals of the phase shifter. The control structure includes a conductive layer covering a portion of the rib and is electrically connected to a first of the control terminals. An insulating layer is configured to electrically isolate the conductive layer from the rib.

According to an embodiment, the control structure includes a first wing of a semiconductor material having a homogeneous conductivity type adjacent a first face of the rib. The insulating layer is configured to isolate the first wing from the rib. The conductive layer is formed by a region of the first wing having a doping level greater than that of the rib. The first control terminal is in electrical contact with the distal end of the first wing.

According to an embodiment, the control structure further includes a second wing of a semiconductor material having a homogeneous conductivity type adjacent a second face of the rib, opposite the first face. The insulating layer is in two parts respectively arranged to isolate the first and second wings from the rib. The conductive layer is in two parts formed by respective first and second areas of the wings having a doping level greater than that of the rib.

According to an embodiment, the second control terminal is in electrical contact with the distal end of the second wing. According to an embodiment, the first control terminal is in electrical contact with the distal ends of the first and second wings, wherein the phase shifter includes a structure configured for establishing an electrical contact between the second control terminal and the rib.

According to an embodiment, the electrical contact structure includes, in a plane offset from that of the first and second wings, a third wing adjacent the first face of the rib and having the same conductivity type as the rib. A fourth wing is adjacent the second face of the rib and has the same conductivity type as the rib. Two electrical contacts are located respectively on the distal ends of the third and fourth wings.

According to an embodiment, the phase shifter includes pairs of third and fourth wings in several planes interleaved along the rib with pairs of first and second wings.

According to an embodiment, the phase shifter includes two wings of a semiconductor material of same conductivity type as the rib, extending the rib from both sides radially. The conductive layer covers a portion of the rib projecting from the plane of the wings.

According to an embodiment, the conductive layer is polysilicon, and the control structure includes, on one of the wings, a polysilicon track connecting the conductive layer to the first control terminal. The first control terminal is located on the distal end of the first wing. An extension of the insulating layer is configured to isolate the first control terminal and the polysilicon track from the first wing.

According to an embodiment, the distal end of the second wing has a higher doping level than the rib and carries the second control terminal. According to an embodiment, the control structure includes, on the second wing, a configuration symmetrical to the first wing. In a plane offset from that of the first and second wings, third and fourth wings of a semiconductor material of the same conductivity type as the rib, extend the rib from both sides radially. The conductive layer covers a portion of the rib projecting from the plane of the third and fourth wings. Two electrical contacts respectively are located at the distal ends of the third and fourth wings.

According to an embodiment, the insulating layer is oxide in the form of a shallow trench insulator (STI).

BRIEF DESCRIPTION OF DRAWINGS

FIGS. 7A and 7B are schematic cross-sectional views of a dual oxide capacitor phase shifter and an equivalent circuit diagram according to an embodiment.

FIG. 8 is a schematic cross-sectional of an exemplary structure for establishing an electrical contact with the central area of the phase shifter of FIG. 7A.

FIG. 9 is a perspective view of an electro-optical phase shifter of the type of FIG. 7A, inserted between two aligned sections of an optical waveguide.

DESCRIPTION OF EMBODIMENTS

Figure 3:
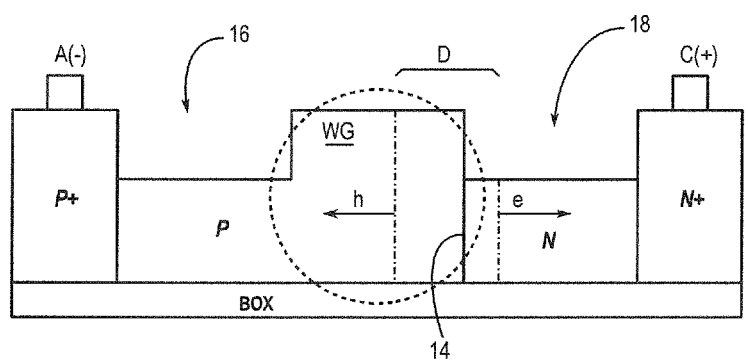
FIG. 3 is a schematic cross-section of an HSPM phase shifter in accordance with the prior art.
Figure 4A:
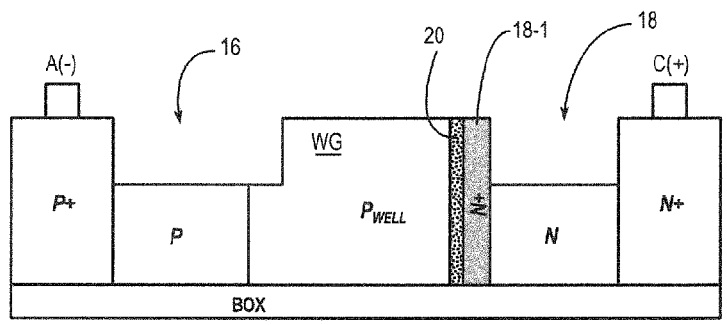
FIGS. 4A and 4B are schematic cross-sectional views of an oxide capacitor phase shifter and an equivalent electric circuit diagram according to an embodiment.

FIG. 4A shows a schematic cross-section, along a plane perpendicular to the axis of the optical waveguide, of an embodiment of an HSPM phase shifter modified to include an oxide capacitor. On a side face of the rib WG, where there was the PN junction 14 of the phase shifter of FIG. 3, an oxide capacitor $C_{ox}$ is formed between the rib WG and the lateral wing 18. The capacitor includes a semiconductor oxide trench 20, for example silicon oxide, extending in this example over the entire height of the rib WG. The portion 18-1 of the wing 18 adjacent the trench oxide 20 is raised up to the rib level for containing the trench oxide. The adjacent portion 18-1 preferably has a high doping level, N+.

The oxide is compatible with the waveguide in that it does not interfere with the optical properties of the surface of the waveguide. In particular, it does not cause parasitic optical coupling.

With this configuration, if the same polarity of the control terminals A and C as in FIG. 3 is kept (as illustrated), the phase shifter behaves similar to a conventional HSPM phase shifter wherein the value of the junction capacitance $C_J$ is replaced by the value of the oxide capacitor $C_{ox}$.

If the oxide capacitor can be achieved with a higher capacitance than the junction capacitance, the phase shifter will generally be more sensitive. The value of the oxide capacitance increases with the inverse of the thickness of the trench oxide. The locally higher doping level of the adjacent area 18-1 participates in increasing the value of the oxide capacitance. To further increase this value, the doping level of the adjacent area of the central rib WG could be locally increased, but this would affect the optical properties of the waveguide, in particular the optical losses.

The trench oxide 20, of about 300 nm in depth, may be fabricated using shallow trench isolation (STI) etching techniques. The doping may be achieved by implantation.

As will be seen hereinafter, it is possible with these techniques, for equivalent dimensions and doping levels, to obtain a greater charge variation in the central zone than with a PN junction. As a result, as illustrated, the doping level of the central zone WG may be reduced to a minimum doping level PWELL, for example 1017 atoms per $cm^3$, to reduce the optical losses without penalizing the sensitivity compared to a conventional shifter.

Preferably, the doping level of each of the side wings 16, 18 is minimal near the central area and increases towards the contacts A and C. Such a doping level gradient is desirable to achieve an optimal compromise between a low response time (favored by the low resistivity provided by a high doping level) and low optical losses in the central area (favored by a low doping level). As shown, a doping concentration gradient may be approximated stepwise in each of the wings, by providing a plurality of areas having staggered doping levels, in particular the central area WG having a minimum doping level PWELL, an area having a intermediate doping level (P, N), and a distal area having the highest doping level (P+, N+).

Figure 4B:
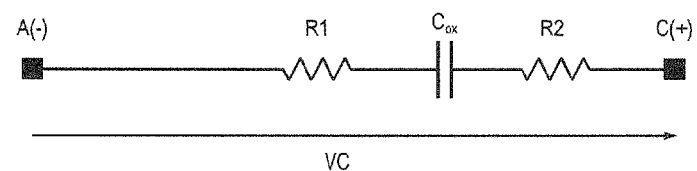

FIG. 4B illustrates an equivalent electrical circuit diagram of the phase shifter of FIG. 4A. A capacitor $C_{ox}$ represents the oxide capacitance formed around the trench 20. A series resistor R1 represents the resistivity of the side wing 16 and of the central zone WG. A series resistor R2 represents the resistivity of the side wing 18. Note that the response speed of the phase shifter to variations of the control voltage VC depends on the RC constant $(R1+R2)C_{ox}$.

Figure 5:
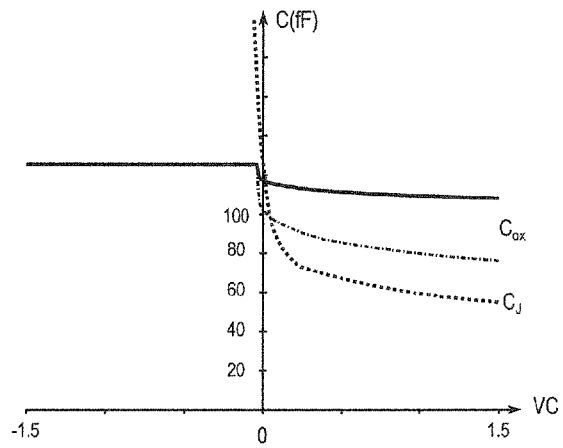
FIG. 5 is a graph of simulated variation curves of an oxide capacitance and of a junction capacitance as a function of a control voltage.

FIG. 5 is a simulation result illustrating the variation curves of oxide capacitance $C_{ox}$ and junction capacitance $C_J$ as a function of the control voltage VC, in structures having the same feature dimensions. The polarity of the voltage VC corresponds to that of FIGS. 4A and 4B, where the "plus" is applied to the N-doped portion, and the "minus" to the P-doped portion. The thickness of the oxide layer is 80 nm.

Note that the oxide capacitance $C_{ox}$ has a maximum limit (approximately 125 fF in the graph) for VC voltage values below a negative threshold, then decreases with a deceleration when the voltage VC increases from the negative threshold. The decrease rate depends on the doping level of the central zone WG. For a doping level of PWELL=1017 atoms per cm3, the capacitance $C_{ox}$ reaches approximately 110 fF at VC=1.5 V (solid curve). In the absence of a doping step, that is to say using the original low doping level of the substrate, for example 1015 atoms per cm3, the capacitance $C_{ox}$ is approximately 75 fF for VC=1.5 V (dotted curve). The maximum value reached for negative values of the voltage VC is independent of the doping level of the central area WG.

It is observed that the junction capacitance $C_J$, shown as a dotted line, decreases rapidly from a theoretically infinite limit, corresponding to the threshold of conduction of the junction, to intersect the curve of the capacitance $C_{ox}$ and evolve below it when voltage VC exceeds zero. The amount of carriers mobilized in the central area WG, thus the sensitivity of the phase shifter, corresponds to the integral of the capacitance variation. These curves thus show that an oxide capacitance causes an increase in sensitivity with respect to a junction capacitance for a positive voltage VC, even using a low doped central zone WG.

The decrease of the capacitances $C_{ox}$ and $C_J$ for positive values of the voltage VC is due to the phenomenon of depletion in the doped areas adjacent the oxide trench and the junction, respectively. This depletion phenomenon confers a negative coefficient to the phase shifter. That is to say, the phase shifter introduces a phase advance that increases when the control voltage VC increases.

In fact, these curves show that it would be useful to use negative values of the voltage VC to reach the maximum capacitance values, and thus reverse the polarity of the voltage VC in FIGS. 4A and 4B.

In the case of a conventional HSPM phase shifter, this configuration is generally not used since it would operate with a forward biased junction, in particular with an increasing leak current and a capacitance tending to infinity. Such a mode of operation is used in another type of phase shifter, a PIN junction phase shifter, whose structure is optimized for operation in this mode. However, PIN junction phase shifters used in current injection mode are relatively slow due to the diffusion phenomenon appearing in forward bias mode—for instance, an HSPM phase shifter may have a bandwidth of several tens of gigahertz, while a PIN phase shifter may have a bandwidth of the order of one hundred megahertz.

When using an oxide capacitor, these limitations may disappear because there is no junction. Thus, the structure of FIG. 4A may be controlled by a voltage VC having its "plus" applied to terminal A and its "minus" to terminal C. In general, the "minus" of the control voltage is applied to the N-doped side of the oxide capacitance, or the "plus" of the control voltage is applied to the P-doped side of the oxide capacitance. Under these conditions, the oxide capacitor is used with its quasi-constant maximum value, and the highest sensitivity is obtained for the phase shifter. In addition, in this mode the phase shifter has a positive coefficient in that it introduces a phase delay that increases with the control voltage.

The doping level of the central area WG does not affect the capacitance, but the series resistor R1. The doping level is then chosen according to the desired compromise between the speed of the phase shifter and the optical losses.

Figure 1:
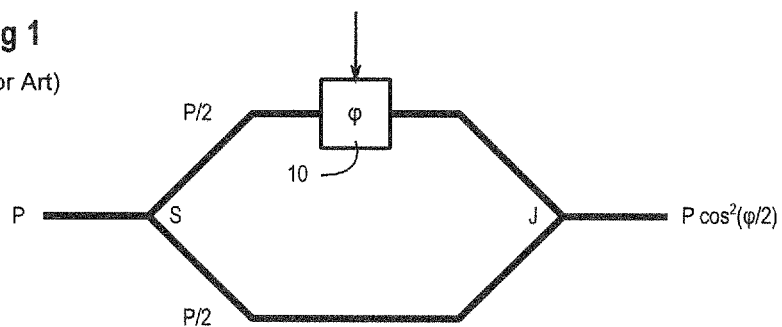
FIG. 1 is a schematic diagram of optical modulator according to the Mach-Zehnder interferometer principle (MZI) in accordance with the prior art.
Figure 2:
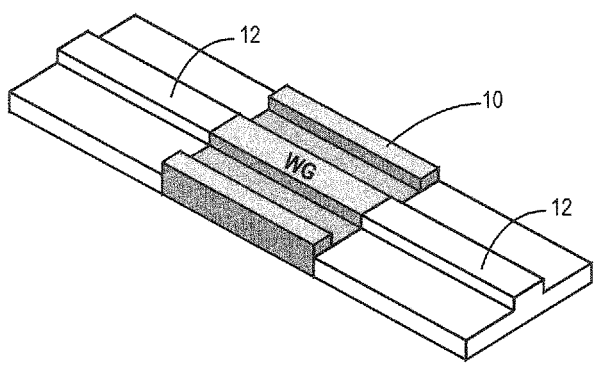
FIG. 2 is a perspective view of an electro-optical phase shifter inserted between two aligned sections of an optical waveguide in accordance with the prior art.
Figure 6:
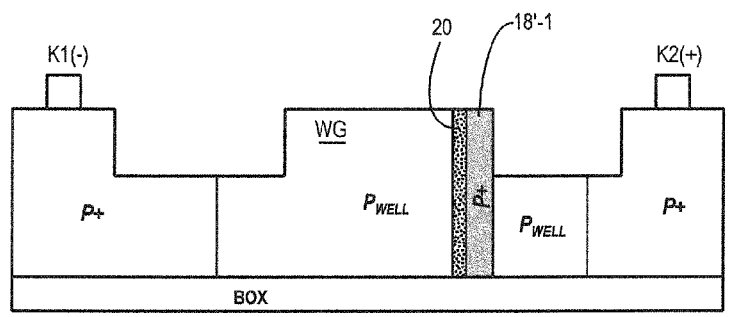
FIG. 6 is a schematic cross-sectional view of an oxide capacitor phase shifter that can be formed from a portion of a waveguide according to an embodiment.

FIG. 6 is a schematic cross-section of an embodiment of an oxide capacitor phase shifter that can be fabricated in few steps from a waveguide section. A waveguide 12, as shown in FIG. 2, is generally formed of a "raw" silicon island, i.e. with a minimum P doping level, referred to as PWELL. In the section of the waveguide, the trench oxide 20 is formed along a side face of the rib WG using an STI process. A P+ doping is achieved by implantation in the distal edges of the side wings, to receive the control contacts, and in the area 18'-1 adjacent the trench oxide 20 on the side opposite the central rib WG. The area 18'-1 extends laterally from the rib of the waveguide. Thus, the portion of the waveguide used for the phase shifter is formed initially with an enlarged rib to fit the trench oxide 20 and provide area 18'-1. The control terminals are designated by K1 (left) and K2 (right), since the structure no longer includes an anode or a cathode.

This structure has the same conductivity type (P) on both sides of the trench oxide 20. Thus, the area connected to the "minus" of the control voltage operates in depletion mode, whereas the area connected to the "plus" is supplied with positive carriers. The depletion phenomenon tends to decrease the value of the capacitance, but its influence decreases with higher doping levels of the affected area. Thus, it may be preferred to apply the "minus" to the higher doped area 18'-1, i.e. the terminal K2.

Similar to the phase shifter of FIG. 4A, the coefficient of the phase shifter depends on the polarity of the control voltage VC. In the most sensitive configuration, with the "minus" on terminal K2, the phase shifter has a positive coefficient. By reversing the polarity, the shifter has a negative coefficient.

FIGS. 7A and 7B show a schematic cross-section of an embodiment of a dual oxide capacitor phase shifter and an equivalent circuit diagram. The right side of the structure of FIG. 7A is similar to that of FIG. 4A. The left side of the structure is symmetrical to the right side relative to a vertical axis passing through the center of the central rib WG. Thus, the left wall of the central rib WG is lined with an oxide trench 21, and the left side wing, here designated 16', is generally N-doped. Similar to wing 18, the doping level of wing 16' is higher (N+) at its distal end and in the portion 16'-1 adjacent to the trench oxide 21. The adjacent portion 16'-1 reaches the height of the central rib to contain the trench 21. The distal parts of the wings 16' and 18 carry respective contacts K1 and K2.

FIG. 7B is an equivalent electrical circuit diagram of the structure of FIG. 7A. The oxide trenches 21 and 20, with their adjacent conductive areas, form capacitors C1ox and C2ox connected in series between the contacts K1 and K2. In addition, the wings 16' and 18 introduce respective series resistors R1 and R2. The central rib WG introduces a series resistance R3 between the two capacitors. The resistor R3 is formed by two equal value resistors R3a and R3b, each representing the resistivity between the center of the rib and the respective capacitor.

The two capacitors $C1_{ox}$ and $C2_{ox}$ have the same value at rest than the capacitor $C_{ox}$ of FIG. 4B. The structure of FIG. 7A therefore has, at rest, between the contacts K1 and K2, half the capacitance than the structure of FIG. 4A. This structure is not optimized for operation with a control voltage applied between the contacts K1 and K2.

With this structure, it may be preferable to apply one pole of the control voltage to both terminals K1 and K2, and the other pole to the central area WG. Under these conditions, each of the capacitors sees the control voltage VC across its terminals so that each capacitor acts independently on the area WG. This doubles the sensitivity of the phase shifter relative to the structure of FIG. 4A.

To make both capacitors operate in their zone of maximum capacity, it may be desirable that the central zone WG, which is P-doped, always be biased at a higher level than the side wings, which are N-doped. Thus the "minus" of the control voltage VC may be applied to both contacts K1 and K2, as shown, and the "plus" to the central area WG.

As shown in FIG. 7B, additional contacts A1 and A2 are provided for bringing the "plus" of the control voltage to the central area WG. To maintain a symmetrical structure, the two contacts A1 and A2 are disposed on either side of the central area WG. It is assumed that the contacts A1 and A2 are electrically connected to the center of the area WG, between the resistors R3a and R3b. A structure for connecting the contacts A1 and A2 to the center of the area WG is equivalent to a resistor R4 leaving from the point of connection between the resistors R3a and R3b, and splitting into two resistors R5 and R6 respectively ending at the contacts A1 and A2.

FIG. 8 shows a cross-section of an exemplary contact structure, along a plane perpendicular to the axis of the waveguide. This contact structure is formed in a plane offset from that of the phase shifter of FIG. 7A. The contact structure includes two P-doped side wings 23 and 24 extending respectively from the two side faces of the center rib WG. The left distal edge of the wing 23 bears contact A1. The right distal edge of the symmetrical wing 24 bears contact A2. Preferably, as for the structure of FIG. 7A, the doping level of each of the wings 23 and 24 follows an increasing gradient from the center to the respective contact A1, A2. This gradient is approached through areas with staggered doping levels P and P+.

FIG. 9 is a perspective view of an electro-optical phase shifter, combining the structures of FIGS. 7A and 8, inserted between two aligned sections of an optical waveguide 12. The center rib WG is continuous and connects the two sections of the waveguide 12. Contact structures of the type of FIG. 8 are spread along this rib and are identified by their contacts A1 and A2. The contact structures are interleaved with phase shifter structures of the type of FIG. 7A, identified by their contacts K1 and K2. The contact structures providing no phase shift effect, but introducing optical losses, are preferably substantially shorter than the phase shifter structures, as shown.

The number and length of the contact structures to be used may be chosen based on the frequency of operation to be achieved, limited by the RC constants of the structures. Indeed, the resistance R4 increases with the spacing between the contact structures, and the resistances R5 and R6 increase when shortening the contact structures.

The choice shown in FIG. 7A of the semiconductor conductivity types and of the polarity of the control voltage may be optimal, since it enables the use of the oxide capacitors in their higher value range (FIG. 5). Other choices are however possible, producing a phase shifter operating under acceptable conditions. For instance, only one conductivity type may be used, for example P, for the wings and the rib, or the polarity of the control voltage may be inverted.

Figure 10:
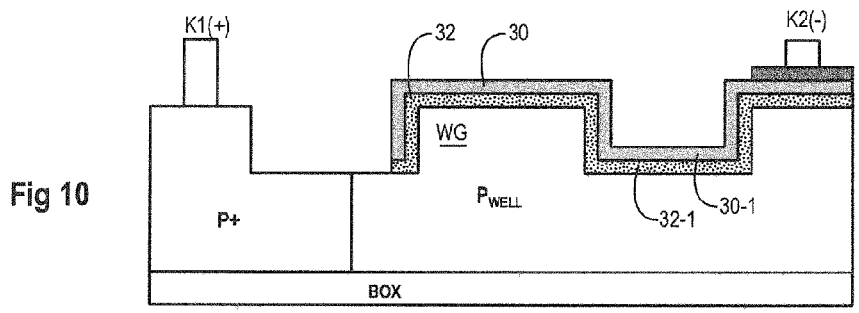
FIG. 10 is a schematic cross-sectional view of an oxide capacitor phase shifter according to another embodiment.

FIG. 10 is a schematic cross-section of an embodiment of a phase shifter having an oxide capacitor similar to a gate capacitor of a MOS transistor. This structure is obtained starting from a section of a waveguide having a minimum doping level $P_{WELL}$. The left part of the structure is similar to that of FIG. 6, having a side wing whose distal portion is highly P-doped (P+) and carries a first contact K1.

An oxide capacitor is formed on the center rib WG of this section, comprising a conductive layer 30, for example polysilicon, which covers the top of the rib and the sidewalls. Layer 30, which is designated by "gate", is isolated from the waveguide by an oxide layer 32. A second contact K2, located at the distal end of the right wing, is connected to the gate 30 by a conductive track 30-1 following the wing profile. The track 30-1 is, for example, polysilicon deposited together with the gate 30. The track 30-1 and the contact K2 are isolated from the waveguide by an extension 32-1 of the oxide layer 32. A layer of silicide 34 is provided between the contact K2 (metal) and polysilicon track 30-1 to ensure a better electrical contact. In practice, a plurality of tracks 30-1 and contacts K2 are distributed along the length of the rib WG.

An oxide capacitor is thus formed between the gate 30 and the central region WG of the waveguide. The contacts K1 and K2 are used to apply a control voltage to the terminals of the capacitor. The track 30-1 offers a low resistivity between contact K2 and the capacitor. The P+ doped portion of the left wing reduces the resistivity between the contact K1 and the capacitor.

Preferably, for the oxide capacitor to operate in its range of higher values the "plus" of the control voltage is applied to the P-doped portion, the contact K1, and the "minus" is applied to the contact K2, as shown in the figure.

Figure 11A:
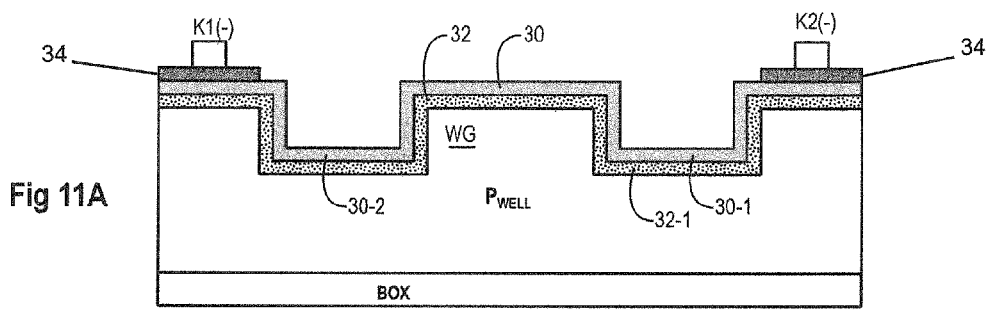
FIGS. 11A and 11B are schematic cross-sectional views according to planes perpendicular to the axis of the waveguide of a modification of the phase shifter of FIG. 10.
Figure 11B:
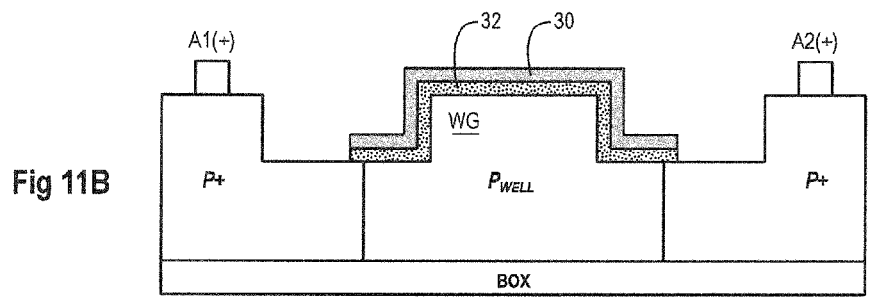
Figure 11C:
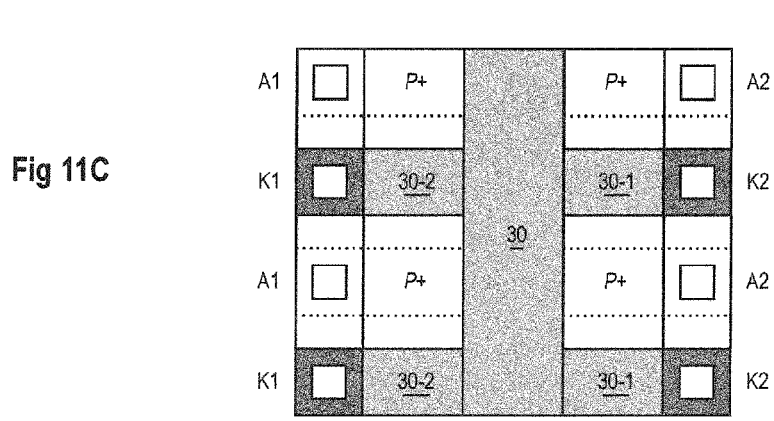
FIG. 11C is a top view of the modification of the phase shifter of FIGS. 11A and 11B.

FIGS. 11A to 11C show an alternative embodiment of the phase shifter of FIG. 10 in two cross-sections according to planes perpendicular to the axis of the waveguide and a top view. This phase shifter is symmetrical with respect to a vertical plane passing through the axis of the waveguide.

In the cross-section of FIG. 11A, the left and right halves of the structure are symmetrical, the right half being similar to that of FIG. 10. The structure thus includes a gate 30 connected at its right to contact K2 through the conductive track 30-1, and at its left to contact K1 through a symmetric conductive track 30-2. The waveguide section is uniformly doped at level $P_{WELL}$ in this view.

The contacts K1 and K2 are thus at the same voltage level—preferably the "minus" of the control voltage is applied thereto. The "plus" of the control voltage is supplied to the central rib WG through a contact structure located in a plane offset along the axis of the waveguide and shown in FIG. 11B.

The contact structure of FIG. 11B is similar to that of FIG. 8. In addition, the gate 30 and the oxide layer 32 of the structure of FIG. 11A are extended to also cover the portion of the rib WG in the contact structure. The contacts A1 and A2 of this structure, insulated from gate 30, both receive the "plus" of the control voltage.

FIG. 11C shows a top view of a phase shifter formed from an interleaving of multiple sections according to FIG. 11A with a multiple sections according to FIG. 11B. It should be noted that the gate 30 may be present throughout the central rib of the waveguide. Thus, the value of the oxide capacitance is independent of the number and length of the contact structures in that it depends on the total length of the phase shifter.

Many variations and modifications of the described embodiments will occur to those skilled in the art. For example, in the embodiments of FIGS. 10 and 11A, the portion of the oxide layer insulating the polysilicon tracks 30-1, 30-2 may be STI filling the space between the rib WG and the raised portion of the edge of the wing. The waveguide WG has been described as being P-doped originally in various embodiments, as this corresponds to the most common manufacturing processes. However, the described teachings apply to any doping type of the waveguide by accordingly adapting the doping of the other elements. Oxide capacitors have been described as preferred embodiments because semiconductor oxide is compatible with the waveguide and fits well in the manufacturing processes. Of course, those skilled in the art may select any other insulating material instead of semiconductor oxide if that is adapted to their particular manufacturing process.

That which is claimed is:

1. An electro-optical phase shifter configured to be located in an optical waveguide, the electro-optical phase shifter comprising:
    a plurality of first and second interleaved phase shifter sections, each comprising
        first and second control terminals,
        a rib comprising a semiconductor material and along a length of the optical waveguide, and a control structure configured to modify a concentration of carriers in said rib based upon a control voltage present between said first and second control terminals and comprising
   at least one conductive layer covering at least a portion of said rib, and
   at least one insulating layer coupled to and between said rib and said at least one conductive layer and configured to electrically isolate said at least one conductive layer from the rib, said at least one conductive layer and said at least one insulating layer being coextensive;
said at least one conductive layer and said at least one insulating layer of each of said first phase shifter sections electrically connected to said first and second control terminals;
said at least one conductive layer and said at least one insulating layer of each of said second phase shifter sections extending to cover at least a portion of said rib and being electrically insulated from said first and second control terminals.

2. The electro-optical phase shifter according to claim 1, wherein each of said second phase shifter sections further comprises a plurality of wings comprising a semiconductor material of same conductivity type as said rib and extending radially from both sides of said rib; and wherein said at least one conductive layer of each of said second phase shifter sections covers at least a portion of said rib projecting from a plane of said plurality of wings.

3. The electro-optical phase shifter according to claim 2, wherein for each of said second phase shifter sections, said at least one conductive layer comprises polysilicon, said control structure comprises, on one of said plurality of wings, a polysilicon track connecting said at least one conductive layer to said first control terminal, said first control terminal is located on a distal end of said one of the plurality of wings, and said at least one insulating layer has an extension configured to isolate said first control terminal and said polysilicon track from said one of said plurality of wings.

4. The electro-optical phase shifter according to claim 2, wherein for each of said second phase shifter sections, a distal end of a second one of said plurality of wings has a higher doping level than said rib and carries said second control terminal.

5. The electro-optical phase shifter according to claim 2, wherein for each of said second phase shifter sections, the control structure comprises:
   on a second one of said plurality of wings, a configuration symmetrical to a first one of said plurality of wings;
   in a plane offset from that of said first and second ones of said plurality of wings, third and fourth ones of said plurality wings comprising a semiconductor material of a same conductivity type as said rib and extending radially from both sides of said rib, wherein said at least one conductive layer covers at least a portion of said rib projecting from the plane of said third and fourth ones of said plurality of wings; and
   at least one electrical contact on a distal end of each of said third and fourth ones of said plurality of wings.

6. An electro-optical phase shifter comprising:
a first phase shifter section comprising
   first and second control terminals,
   a rib comprising semiconductor material, and
   a control structure electrically coupled to said first and second control terminals and comprising
      at least one conductive layer covering at least a portion of said rib, and
      at least one insulating layer coupled to and between said rib and said at least one conductive layer and configured to electrically isolate said at least one conductive layer from the rib, said at least one conductive layer and said at least one insulating layer being coextensive,
   said at least one conductive layer and said at least one insulating layer of said first phase shifter sections electrically connected to said first and second control terminals; and
a second phase shifter section coupled to said first phase shifter section and comprising
   first and second control terminals,
   a rib comprising semiconductor material, and
   a control structure electrically coupled to said first and second control terminals and comprising
      at least one conductive layer covering at least a portion of said rib and electrically connected to said first control terminal, and
      at least one insulating layer coupled to and between said rib and said at least one conductive layer and configured to electrically isolate said at least one conductive layer from the rib, said at least one conductive layer and said at least one insulating layer being coextensive,
   said at least one conductive layer and said at least one insulating layer of said second phase shifter sections extending to cover at least a portion of said rib and being electrically insulated from said first and second control terminals.

7. The electro-optical phase shifter according to claim 6, wherein said second phase shifter section further comprises a plurality of wings comprising a semiconductor material of same conductivity type as said rib and extending radially from both sides of said rib; and wherein said at least one conductive layer of said second phase shifter section covers at least a portion of said rib projecting from a plane of said plurality of wings.

8. The electro-optical phase shifter according to claim 7, wherein, for said second phase shifter section, said at least one conductive layer comprises polysilicon, said control structure comprises, on one of said plurality of wings, a polysilicon track connecting said at least one conductive layer to said first control terminal, said first control terminal is located on a distal end of said one of the plurality of wings, and said at least one insulating layer has an extension configured to isolate said first control terminal and said polysilicon track from said one of said plurality of wings.

9. The electro-optical phase shifter according to claim 7, wherein for said second phase shifter section, a distal end of a second one of said plurality of wings has a higher doping level than said rib and carries said second control terminal.

10. The electro-optical phase shifter according to claim 7, wherein for said second phase shifter section, the control structure comprises:
   on a second one of said plurality of wings, a configuration symmetrical to a first one of said plurality of wings;
   in a plane offset from that of said first and second ones of said plurality of wings, third and fourth ones of said plurality of wings comprising a semiconductor material of a same conductivity type as said rib and extending radially from both sides of said rib, wherein said at least one conductive layer covers at least a portion of said rib projecting from the plane of said third and fourth ones of said plurality of wings; and at least one electrical contact on a distal end of each of said third and fourth ones of said plurality of wings.

\* \* \* \* \*